(12) United States Patent
Imamura

(10) Patent No.: US 10,193,433 B2
(45) Date of Patent: Jan. 29, 2019

(54) RAILWAY VEHICLE CONTROL APPARATUS

(71) Applicant: MITSUBISHI ELECTRIC CORPORATION, Chiyoda-ku, Tokyo (JP)

(72) Inventor: Yasutaka Imamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/573,256

(22) PCT Filed: Jun. 25, 2015

(86) PCT No.: PCT/JP2015/068366
§ 371 (c)(1),
(2) Date: Nov. 10, 2017

(87) PCT Pub. No.: WO2016/208035
PCT Pub. Date: Dec. 29, 2016

(65) Prior Publication Data
US 2018/0138798 A1    May 17, 2018

(51) Int. Cl.
*H02M 1/08* (2006.01)
*B60K 6/46* (2007.10)
(Continued)

(52) U.S. Cl.
CPC ............... *H02M 1/08* (2013.01); *B60K 6/46* (2013.01); *B60L 11/08* (2013.01); *B60W 10/00* (2013.01);
(Continued)

(58) Field of Classification Search
CPC ........... H02M 1/08; H02M 3/335; B61C 3/00; B61C 5/00; H02P 9/04; F02D 29/06
See application file for complete search history.

(56) References Cited

U.S. PATENT DOCUMENTS

| 5,214,358 A * | 5/1993 | Marshall | B60K 6/30 180/65.245 |
| 7,489,093 B2 * | 2/2009 | King | B60K 6/46 318/109 |

(Continued)

FOREIGN PATENT DOCUMENTS

| EP | 2 679 459 A2 | 1/2014 |
| JP | H-11-8910 A | 1/1999 |

(Continued)

OTHER PUBLICATIONS

International Search Report (PCT/ISA/210) dated Aug. 25, 2015, by the Japanese Patent Office as the International Searching Authority for International Application No. PCT/JP2015/068366.
(Continued)

*Primary Examiner* — Daniel Kessie
(74) *Attorney, Agent, or Firm* — Buchanan Ingersoll & Rooney PC

(57) ABSTRACT

A primary circuit and a secondary circuit each have a switching element, each operate as a power conversion circuit while the switching element is activated, and each operate as a rectifier circuit while the switching element is deactivated. While a generator provided at the primary side of a first power conversion device is stopped, a controller activates the switching element of the secondary circuit and deactivates the switching element of the primary circuit. Accordingly, the first power conversion device converts electric power input from the secondary side and supplies electric power for causing the generator to operate. While the generator is operated, the controller activates the switching element of the primary circuit and deactivates the switching element of the secondary circuit such that the first power conversion device converts electric power supplied from the generator and outputs the converted electric power to the secondary side.

5 Claims, 6 Drawing Sheets

(51) Int. Cl.
    *B60L 11/08*     (2006.01)
    *B60W 10/00*     (2006.01)
    *B60W 20/00*     (2016.01)
    *F02D 29/06*     (2006.01)
    *H02P 9/04*     (2006.01)
    *B61C 3/00*     (2006.01)
    *H02M 3/335*     (2006.01)
    *B61C 5/00*     (2006.01)
    *H02M 7/44*     (2006.01)
    *H02M 7/68*     (2006.01)

(52) U.S. Cl.
    CPC ............... *B60W 20/00* (2013.01); *B61C 3/00* (2013.01); *F02D 29/06* (2013.01); *H02M 3/335* (2013.01); *H02P 9/04* (2013.01); *B61C 5/00* (2013.01); *H02M 7/44* (2013.01); *H02M 7/68* (2013.01); *Y10S 903/951* (2013.01)

(56) References Cited

U.S. PATENT DOCUMENTS

| | | |
|---|---|---|
| 2003/0029654 A1 | 2/2003 | Shimane et al. |
| 2009/0171521 A1* | 7/2009 | Moki ...................... B60L 11/18 701/22 |
| 2009/0230689 A1* | 9/2009 | Burra ...................... H02J 9/062 290/55 |
| 2010/0253139 A1* | 10/2010 | King ...................... B60L 11/005 307/9.1 |
| 2012/0062027 A1 | 3/2012 | Domoto |
| 2012/0146406 A1* | 6/2012 | Lin .......................... B60K 6/46 307/9.1 |
| 2014/0197681 A1* | 7/2014 | Iwashima ............... B60R 16/03 307/9.1 |

FOREIGN PATENT DOCUMENTS

| | | |
|---|---|---|
| JP | 2003-61209 A | 2/2003 |
| JP | 2012-61942 A | 3/2012 |
| JP | 2014-11828 A | 1/2014 |
| JP | 2014-91504 A | 5/2014 |

OTHER PUBLICATIONS

Written Opinion (PCT/ISA/237) dated Aug. 25, 2015, by the Japanese Patent Office as the International Searching Authority for International Application No. PCT/JP2015/068366.

Japanese Office Action (Notification of Reasons for Rejection) dated Jul. 25, 2017 issued by the Japanese Patent Office in the corresponding Japanese Patent Application No. 2017-524523. (6 pages)(with partial English Translation).

* cited by examiner

RAILWAY VEHICLE CONTROL APPARATUS

TECHNICAL FIELD

The present disclosure relates to a railway vehicle control apparatus mounted on a railway vehicle using an internal combustion engine.

BACKGROUND ART

A railway vehicle control apparatus, mounted on a railway vehicle running on a non-electrification route without overhead line equipment, converts AC power generated by a generator driven by internal combustion engines such as diesel engines, and supplies the converted AC power to a main motor to drive the main motor. As the generator, a separately excited synchronous generator is used that generates an electromotive force by rotation. In addition, a highly efficient permanent magnet-type synchronous generator is sometimes used for size reduction, weight reduction, and increased efficiency, and an induction generator having excellent maintainability is also sometimes used.

A driving device of railway vehicles disclosed in Patent Literature 1 includes an induction generator driven by an engine, a first power conversion device that converts AC power output from the induction generator to DC power, and a smoothing capacitor smoothing the DC power output from the first power conversion device. The driving device of the railway vehicles charges the smoothing capacitor using electric power storage means supplying electric power to a control device on the railway vehicle, using the electric power charged by the smoothing capacitor, and supplies electric power to the induction generator for starting power generation operations.

Patent Literature 1 discloses a method in which the induction generator is driven as a motor in a state in which the engine is stopped, and an external force is applied to start the engine. In addition, Patent Literature 1 discloses that, in a state in which the engine is performing a self-sustained rotation, the induction generator is excited by supplying an electric current for starting power generation from an external source when the induction generator is started.

CITATION LIST

Patent Literature

Patent Literature 1: Unexamined Japanese Patent Application Kokai Publication No. 2014-011828

SUMMARY OF INVENTION

Technical Problem

The driving device of railway vehicles disclosed in Patent Literature 1 requires a contactor disposed between electric power storage means and the smoothing capacitor, and current reduction means such as a resistor or the like for the purpose of charging the smoothing capacitor and preventing a backflow of the electric power. Therefore, the number of parts forming the driving device of the railway vehicles increases, leading to problems of decreased reliability and increased costs. While railway vehicles are running, voltage of the smoothing capacitor is high. However, voltages of the electric power storage means are low. Therefore, in the driving device of the railway vehicles, there are safety issues of possibility of contacting a high voltage circuit and a low voltage circuit when the contactor does not work appropriately due to stagnation or the like, or when the contactor is erroneously input, and cannot prevent a backflow of the electric power.

The present disclosure is made in view of the above-mentioned circumstances, and the object thereof is, with a simpler configuration, to prevent contacts between the high voltage circuit and the low voltage circuit, and to supply electric power for causing the generator to operate that is driven by the internal combustion engines.

Solution to Problem

In order to achieve the above-mentioned object, the railway vehicle control apparatus of the present disclosure includes a first power conversion device including a primary circuit and a secondary circuit, a controller, a second power conversion device, a primary side thereof being connected to an alternating current generator, to perform bidirectional power conversions between the primary side and a secondary side; a smoothing capacitor connected to secondary side terminals of the second power conversion device and connected to terminals of the primary side of the first power conversion device; and an inverter connected in parallel with the smoothing capacitor between the secondary side terminals of the second power conversion device. Each of the primary circuit and the secondary circuit includes a switching element. When the switching element is activated, each of the primary circuit and the secondary circuit operates as a power conversion circuit. When the switching element is deactivated, each of the primary circuit and the secondary circuit operates as a rectifier circuit. The first power conversion device performs bidirectional power conversions between a primary side and a secondary side. When one of either the switching element of the primary circuit or the switching element of the secondary circuit is activated, the controller performs control to deactivate the other switching element. While an alternating current generator is stopped that is disposed on the primary side of the first power conversion device and driven by an internal combustion engine to output alternating current power, the controller activates the switching element of the secondary circuit, and deactivates the switching element of the primary circuit such that the first power conversion device converts electric power input from the secondary side to supply electric power for causing the alternating current generator to operate. During operation of the alternating current generator, the controller activates the switching element of the primary circuit and deactivates the switching element of the secondary circuit such that the first power conversion device converts electric power supplied from the alternating current generator to output the converted electric power to the secondary side. The controller further controls the second power conversion device. While the alternating current generator is stopped, (i) the controller, in response to a start command of the internal combustion engine, activates the switching element of the secondary circuit, and deactivates the switching element of the primary circuit such that the first power conversion device converts electric power stored in an electric power storage device connected to the secondary side terminals of the first power conversion device to charge the smoothing capacitor; (ii) thereafter the controller controls the second power conversion device such that the second power conversion device converts electric power stored in the smoothing capacitor to supply electric power for causing the alternating current generator to operate; (iii) the internal combustion engine is started by a torque output by the alternating current generator to which electric power from the second power conversion device is supplied and (iv) when starting operation of the internal combustion engine is completed, the controller deactivates the switching element of the primary circuit and the switching element of the secondary circuit. While the alternating current generator is operated, (i) the controller controls the second power conversion device such that the second power conversion device converts the electric power supplied from the alternating current generator to charge the smoothing capacitor; and (ii) thereafter, when the voltage of the smoothing capacitor is greater than or equal to a threshold and the inverter is in a state of capable of being activated, the controller activates the switching element of the primary circuit and deactivates the switching element of the secondary circuit such that the first power conversion device converts the electric power supplied to the secondary side terminals of the second power conversion device to charge the electric power storage device.

Advantageous Effects of Invention

The present disclosure activates one of either the switching element of the primary circuit or the switching element of the secondary circuit, included in the first power conversion device, controls the other switching element to cause deactivation, thereby, with a simpler configuration, enabling supply of the electric power for causing the generator to operate that is driven by the internal combustion engine while preventing contacts between the high voltage circuit and the low voltage circuit.

DESCRIPTION OF EMBODIMENTS

Figure 1:
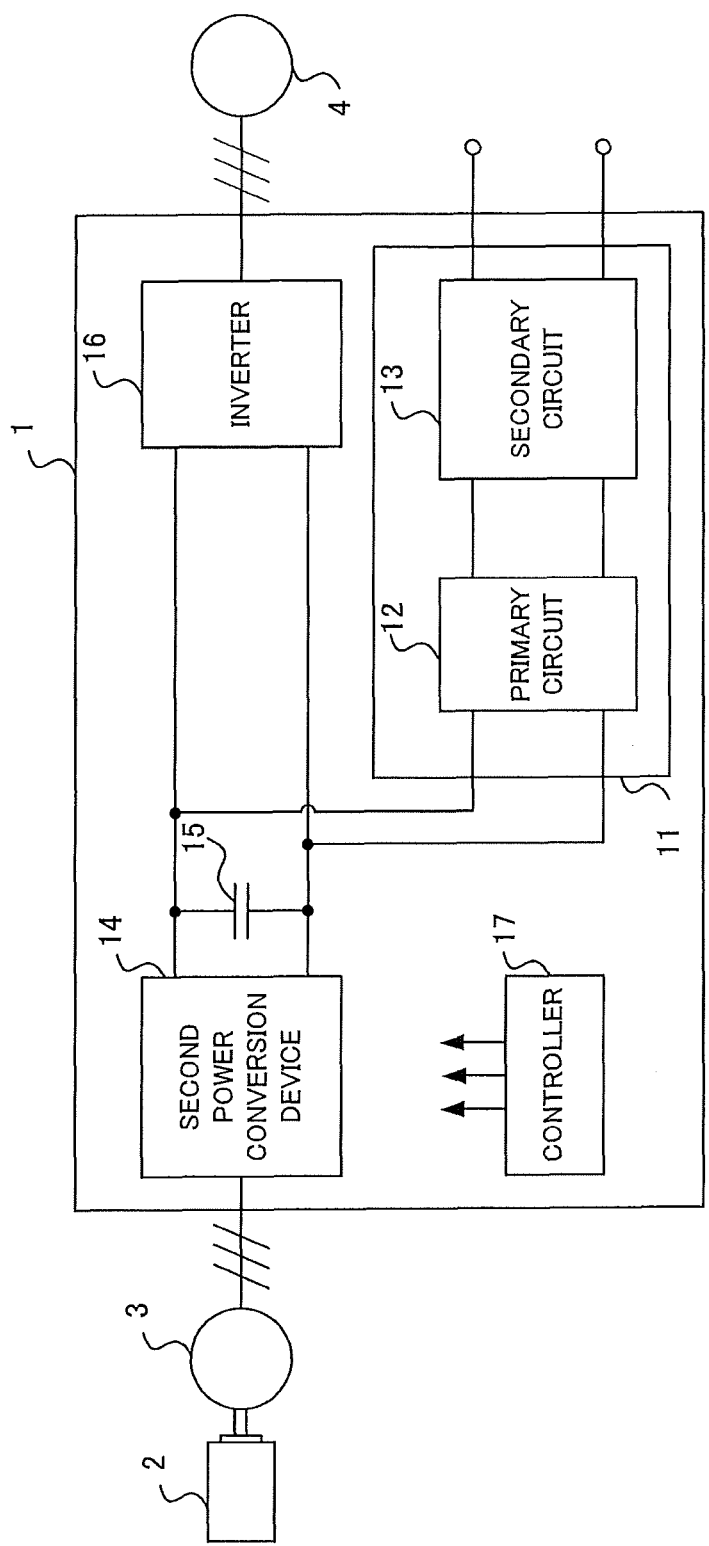
FIG. 1 is a block diagram illustrating a configuration example of a control device for railway vehicles according to Embodiment 1 of the present disclosure.

Embodiments of the present disclosure are described below with reference to the drawings. In the drawings, parts indicated by the same reference sign are identical or corresponding parts.

(Embodiment 1)

FIG. 1 is a block diagram illustrating a configuration example of a railway vehicle control apparatus according to Embodiment 1 of the present disclosure. A railway vehicle control apparatus 1 is mounted on a railway vehicle driven, for example, by an internal combustion engine 2 such as a diesel engine. In Embodiment 1, the internal combustion engine 2 does not have a starting device such as a cell motor. The railway vehicle control apparatus 1 causes a generator 3 to operate as a motor and causes the internal combustion engine 2 to start to rotate. After the internal combustion engine 2 starts self-sustained rotation, the generator 3 starts an electric power generation operation.

The railway vehicle control apparatus 1 includes:
a first power conversion device 11;
a second power conversion device 14 disposed between the generator 3 and a primary side of the first power conversion device 11 and the generator 3 being connected to the primary side;
a smoothing capacitor 15 that smooths each of output electric power of the first power conversion device 11 and output electric power of the second power conversion device 14;
an inverter 16 that is a load device connected in parallel with the smoothing capacitor 15 between secondary side terminals of the second power conversion device 14; and
a controller 17. The generator 3 is an AC generator, and a synchronous generator or an induction generator.

The first power conversion device 11 includes a primary circuit 12 and a secondary circuit 13, each having a switching element such as an Insulated Gate Bipolar Transistor (IGBT), operating as a power conversion circuit when the switching element is activated, namely when the switching element performs a switching operation, and operating as a rectifier circuit when the switching element is deactivated. The primary circuit 12 and the secondary circuit 13 may be electrically connected or may be magnetically connected in an insulated state. When the primary circuit 12 and the secondary circuit 13 are connected, for example, via a transformer, an insulated state of the primary circuit 12 and the secondary circuit 13 can more reliably prevent contacting between a high voltage circuit including the smoothing capacitor 15 and a low voltage circuit connected to secondary side of the first power conversion device 11.

In an example in FIG. 1, the first power conversion device 11 is a direct current (DC)-DC converter that performs bidirectional power conversions between the primary side and the secondary side. The second power conversion device 14 is an alternating current (AC)-DC converter that performs bidirectional power conversions between primary side and secondary side. The smoothing capacitor 15 smooths each of DC power output by the first power conversion device 11 and DC power output by the second power conversion device 14. The inverter 16 converts the DC power that is supplied to the secondary side terminals of the second power conversion device 14, to AC power, and supplies the AC power as electric power for causing a motor 4 to operate.

An electric power source connected to the secondary side of the first power conversion device 11 is, for example, an electric power storage device supplying electric power to a not-shown control apparatus mounted on a railway vehicle. Voltages of the electric power storage device are generally 24V, 72V, 100V, 110V and the like. The control apparatuses mounted on railway vehicles includes, for example, at least one of a signal apparatus mounted on railway vehicles such as an automatic train control (ATC) mounted on railway vehicles, a railway operator's cab, a central control device communicating with apparatuses mounted on a trainset, and a brake control device.

The controller 17 controls the primary circuit 12 and the secondary circuit 13 included in the first power conversion device 11, the second power conversion device 14, and the inverter 16. When the controller 17 activates one of either the switching element of the primary circuit 12 or the switching element of the secondary circuit 13, the controller 17 controls the other switching element to cause deactivation. The controller 17 includes a processor including a central processing unit (CPU) and an internal memory, and a memory including a random access memory (RAM) and a flash memory. The controller 17 executes a control program stored in the memory and sends control signals to switching elements of the first power conversion device 11, the second power conversion device 14, and the inverter 16, and controls the first power conversion device 11, the second power conversion device 14 and the inverter 16.

A description is given of operation of the railway vehicle control apparatus 1 in a case, as an example, in which the electric power storage device is connected to the secondary side terminals of the first power conversion device 11. During the deactivation of the generator 3, the controller 17 activates the switching element of the secondary circuit 13 and deactivates the switching element of the primary circuit 12 such that the first power conversion device 11 converts the electric power stored in the electric power storage device connected to the secondary side of the first power conversion device 11 to charge the smoothing capacitor 15. After the smoothing capacitor 15 is charged, the controller 17 controls the second power conversion device 14 such that the second power conversion device 14 converts the electric power stored in the smoothing capacitor 15, and supplies the electric power for causing the generator 3 to operate. In other words, during the deactivation of the generator 3, the controller 17 activates the switching element of the secondary circuit 13 and deactivates the switching element of the primary circuit 12 such that the first power conversion device 11 converts the electric power input from the secondary side of the first power conversion device 11 to supply electric power for causing the generator 3 to operate.

The electric power for causing the generator 3 to operate means the electric power required to rotate the stopped generator 3 as a motor. The internal combustion engine 2 is started by causing the generator 3 to operate as a motor. Thereafter, when starting operation of the internal combustion engine 2 is completed and the self-sustained rotation is started, the generator 3 can start generation operation. When the starting operation of the internal combustion engine 2 is completed, the controller 17 deactivates the switching element of the primary circuit 12 and the switching element of the secondary circuit 13.

During operation of the generator 3, the controller 17 controls the second power conversion device 14 such that the second power conversion device 14 converts the AC power supplied from the generator 3 to DC power to charge the smoothing capacitor 15. After the smoothing capacitor 15 is charged, the controller 17 activates the switching element of the primary circuit 12 and deactivates the switching element of the secondary circuit 13 such that the first power conversion device 11 converts the electric power supplied to the secondary side terminals of the second power conversion device 14 to charge the electric power storage device. In other words, during the operation of the generator 3, the controller 17 activates the switching element of the primary circuit 12 and deactivates the switching element of the secondary circuit 13 such that the first power conversion device 11 converts the electric power supplied from the generator 3 to output to the secondary side of the first power conversion device 11.

Figure 2:
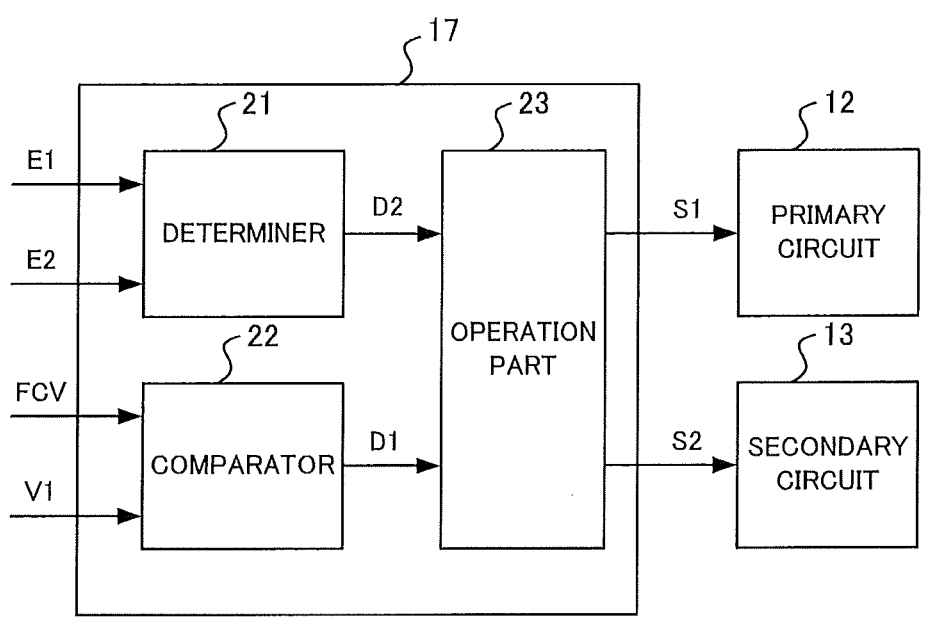
FIG. 2 is a block diagram illustrating a configuration example of a controller according to Embodiment 1.
Figure 3:
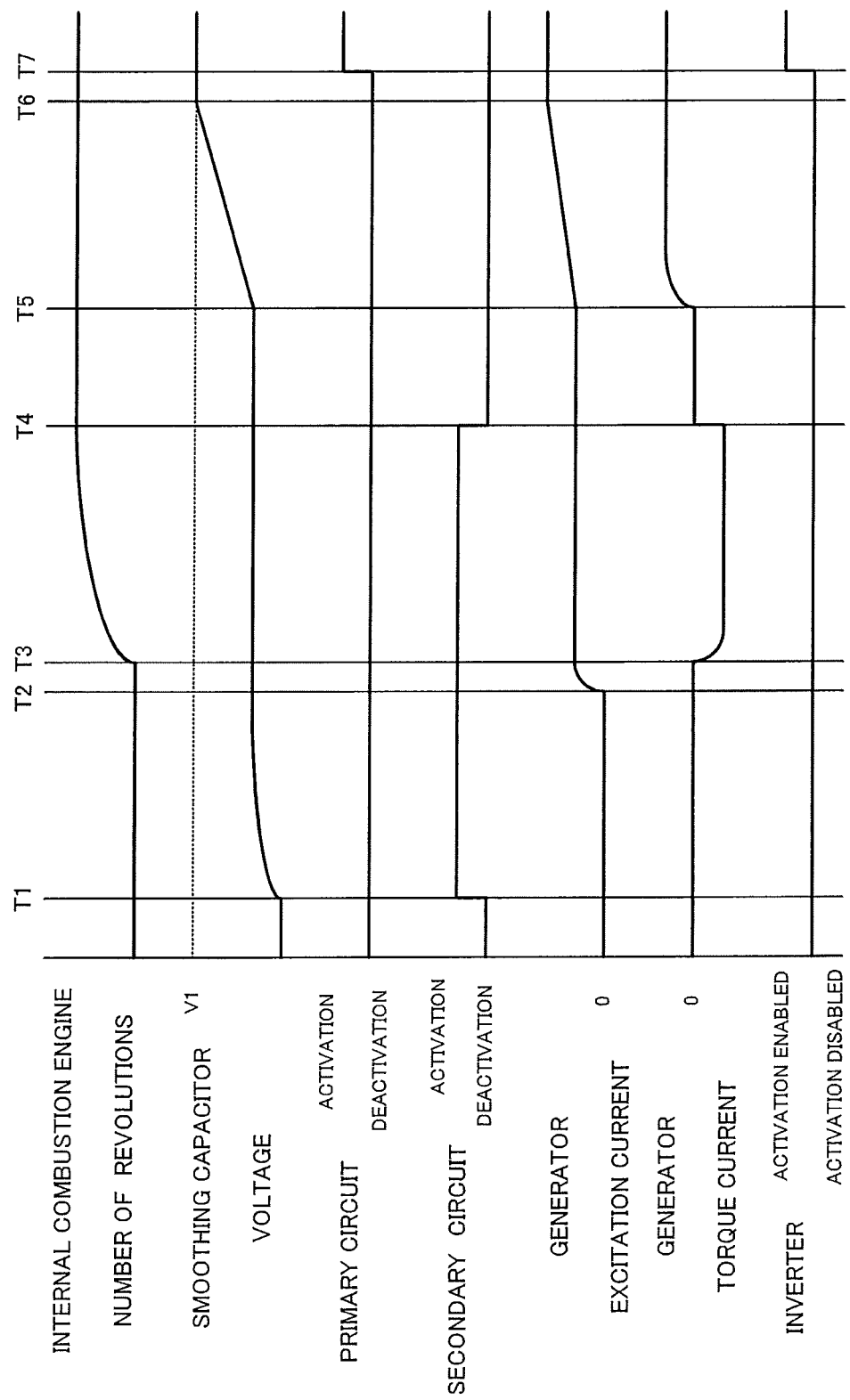
FIG. 3 is a timing chart illustrating starting operation of a generator performed by the railway vehicle control apparatus according to Embodiment 1.

FIG. 2 is a block diagram illustrating a configuration example of a controller according to Embodiment 1. FIG. 2 illustrates portions of the controller 17 relating to controlling the primary circuit 12 and the secondary circuit 13. The controller 17 includes a determiner 21 outputting a drive command D2 based on a start command E1 of the internal combustion engine 2 and a start operation completion signal E2 of the internal combustion engine 2, a comparator 22 outputting a drive command D1 based on a voltage FCV of the smoothing capacitor 15 and a threshold voltage V1, and an operation part 23 outputting control signals S1 and S2 to the primary circuit 12 and to the secondary circuit 13 based on the outputs from the determiner 21 and the comparator 22. FIG. 3 is a timing chart illustrating a starting operation of the generator performed by the railway vehicle control apparatus according to Embodiment 1. The starting operation of the generator 3 by the railway vehicle control apparatus 1 is described with reference to FIG. 2 and FIG. 3.

Sufficient electric power is stored in the electric power storage device connected between the secondary side terminals of the first power conversion device 11. At time T1, engine starting operation by the train crew, for example, starts the starting operation of the generator 3 by the railway vehicle control apparatus 1. At time T1, when the determiner 21 acquires the start command E1 of the internal combustion engine 2, for example, from the control apparatuses mounted on a railway vehicle, the determiner 21 sends the drive command D2, for example, a level high (H) drive command D2 to the operation part 23, commanding the activation of the switching element of the secondary circuit 13. When the operation part 23 receives the level H drive command D2, the operation part 23 performs a control operation necessary for the activation of the switching element of the secondary circuit 13 and sends the control signal S2 activating the switching element of the secondary circuit 13 to the secondary circuit 13. While the switching element of the secondary circuit 13 is activated, the switching element of the primary circuit 12 is controlled to be in a deactivated state. As mentioned above, the controller 17 controls the primary circuit 12 and the secondary circuit 13 such that the first power conversion device 11 converts the electric power stored in the electric power storage device to charge the smoothing capacitor 15.

An initial charge of the smoothing capacitor 15 is completed at a time T2, the controller 17 controls the second power conversion device 14 such that the second power conversion device 14 converts the electric power stored in the smoothing capacitor 15 to supply electric power for causing the generator 3 to operate. At the time T2, supply of an excitation current from the second power conversion device 14 to the generator 3 is started. At a time T3, when the excitation current of the generator 3 reaches a current value that can stably start generation, a torque current from the second power conversion device 14 is supplied to the generator 3. At the time T3, the generator 3 starts rotating as a motor, and a force is applied to the internal combustion engine 2.

When the starting operation of the internal combustion engine 2 is completed at time T4, the internal combustion engine 2 starts self-sustained rotation, the controller 17 controls the second power conversion device 14 such that the torque current of the generator 3 becomes 0. When the determiner 21 acquires the start operation completion signal E2 of the internal combustion engine 2 from the control apparatuses mounted on a railway vehicle at the time T4, the determiner 21 changes the drive command D2 to a low (L) level. When the drive command D2 reaches the L level, the operation part 23 stops output of the control signal S2 activating the switching element of the secondary circuit 13, and causes deactivation of the switching element of the secondary circuit 13. In addition, the switching element of the primary circuit 12 remains in the deactivated state.

Instead of acquiring the start operation completion signal E2 of the internal combustion engine 2, the determiner 21 may determine whether the start operation of the internal combustion engine 2 is completed based on the number of revolutions of the internal combustion engine 2, the number of revolutions of the generator 3, and the like.

When the number of revolutions of the internal combustion engine 2 becomes stable at time T5, the controller 17 controls the second power conversion device 14, and the second power conversion device 14 starts constant voltage control. At a time T6, when the voltage FCV is greater than or equal to the threshold voltage V1, the torque current becomes constant due to constant voltage control of the second power conversion device 14, and the voltage of the smoothing capacitor 15 is kept constant. The threshold voltage V1 can be, for example, determined in response to the characteristics of the second power conversion device 14, the inverter 16 or the like.

The voltage FCV of the smoothing capacitor 15 and the threshold voltage V1 are input into the comparator 22. The comparator 22 compares the threshold voltage V1 with the voltage FCV, and sends to the operation part 23 the drive command D1 commanding the activation of the switching element of the primary circuit 12. The drive command D1 is at an H level when the voltage FCV is greater than or equal to the threshold voltage V1, and the drive command D1 is at an L level when the voltage FCV is less than the threshold voltage V1. At time T7, the drive command D1 output by the comparator 22 changes from the L level to the H level. When the operation part 23 receives the level H drive command D1, the operation part 23 performs a control operation necessary for the activation of the switching element of the primary circuit 12 and sends, to the primary circuit 12, the control signal S1 activating the switching element of the primary circuit 12. While the switching element of the primary circuit 12 is activated, the switching element of the secondary circuit 13 is controlled to be in a deactivated state. As described above, the controller 17 controls the primary circuit 12 and the secondary circuit 13 such that the first power conversion device 11 converts the electric power supplied between the secondary side terminals of the second power conversion device 14 to charge the electric power storage device.

At the time T7, the inverter 16 is in a state of capable of being activated. Then, when a powering command is input by an operation of a train crew, the inverter 16 starts to operate and drives the motor 4, and the railway vehicle starts running After the time T7, due to the electric power storage device being charged by the first power conversion device 11, the voltage of the electric power storage device, which drops due to the charge of the smoothing capacitor 15, rises again, and the generator 3 can be restarted.

Starting procedure of the generator 3 by the railway vehicle control apparatus 1 is not limited to the example of FIG. 3. Initial charge completion timing of the smoothing capacitor 15 and supply start timing of the excitation current to the generator 3 may be different from each other. The timing when the excitation current is supplied to the generator 3 from the second power conversion device 14 and the timing when the torque current is supplied may be the same. The timing when the internal combustion engine 2 starts the self-sustained rotation and the timing when the second power conversion device 14 starts the constant voltage control may be the same. The voltage of the smoothing capacitor 15 at the time when the initial charge of the smoothing capacitor 15 is completed may be a value greater than or equal to the threshold voltage V1. In addition, after the second power conversion device 14 starts the constant voltage control, charging of the electric power storage device by the first power conversion device 11 can be started at any time.

In addition, after having performed the control operation necessary for the activation of the switching element of the primary circuit 12 and the switching element of the secondary circuit 13, the operation part 23 may determine which one of the switching element of the primary circuit 12 and the switching element of the secondary circuit 13 is to be activated based on outputs from the determiner 21 and the comparator 22, and the operation part 23 may output the control signals S1 and S2.

Due to activation of only one of the switching element of the primary circuit 12 and the switching element of the secondary circuit 13, a power transmission direction of the first power conversion device 11 can be controlled and can prevent a backflow of the electric power. In addition, no contactor is required between the high voltage circuit including the smoothing capacitor 15 and the low voltage circuit including the electric power storage device, and the structure may be simple.

As described above, the railway vehicle control apparatus 1 according to the present Embodiment 1, while preventing contacts between the high voltage circuit and the low voltage circuit, can, by a simpler configuration, supply electric power for causing the generator to operate that is driven by the internal combustion engine.

(Embodiment 2)

A configuration of the railway vehicle control apparatus 1 according to Embodiment 2 is the same as the configuration of the railway vehicle control apparatus 1 according to Embodiment 1 as illustrated in FIG. 1. In Embodiment 2, the internal combustion engine 2 has a starting device such as a cell motor. After the start of the internal combustion engine 2, the railway vehicle control apparatus 1 excites the generator 3, which is an induction generator, such that the generator 3 starts a power generation operation.

A description is given of operation of the railway vehicle control apparatus 1 in a case, as an example, in which the electric power storage device is connected between the secondary side terminals of the first power conversion device 11. When start of the internal combustion engine 2 is completed while the generator 3 is stopped, the controller 17 activates the switching element of the secondary circuit 13 and deactivates the switching element of the primary circuit 12, such that the first power conversion device 11 converts the electric power stored in the electric power storage device to charge the smoothing capacitor 15. After the smoothing capacitor 15 is charged, the controller 17 controls the second power conversion device 14 such that the second power conversion device 14 converts the electric power stored in the smoothing capacitor 15 to supply electric power for causing the generator 3 to operate. The electric power for causing the generator 3 to operate is electric power necessary for excitation of the generator 3.

By the controller 17 controlling the second power conversion device 14 during the operation of the generator 3, the second power conversion device 14 converts the AC power output by the generator 3 to DC power to charge the smoothing capacitor 15. After the smoothing capacitor 15 is charged, by the controller 17 activating the switching element of the primary circuit 12 and deactivating the switching element of the secondary circuit 13, the first power conversion device 11 converts the electric power supplied between the secondary side terminals of the second power conversion device 14 to charge the electric power storage device.

Figure 4:
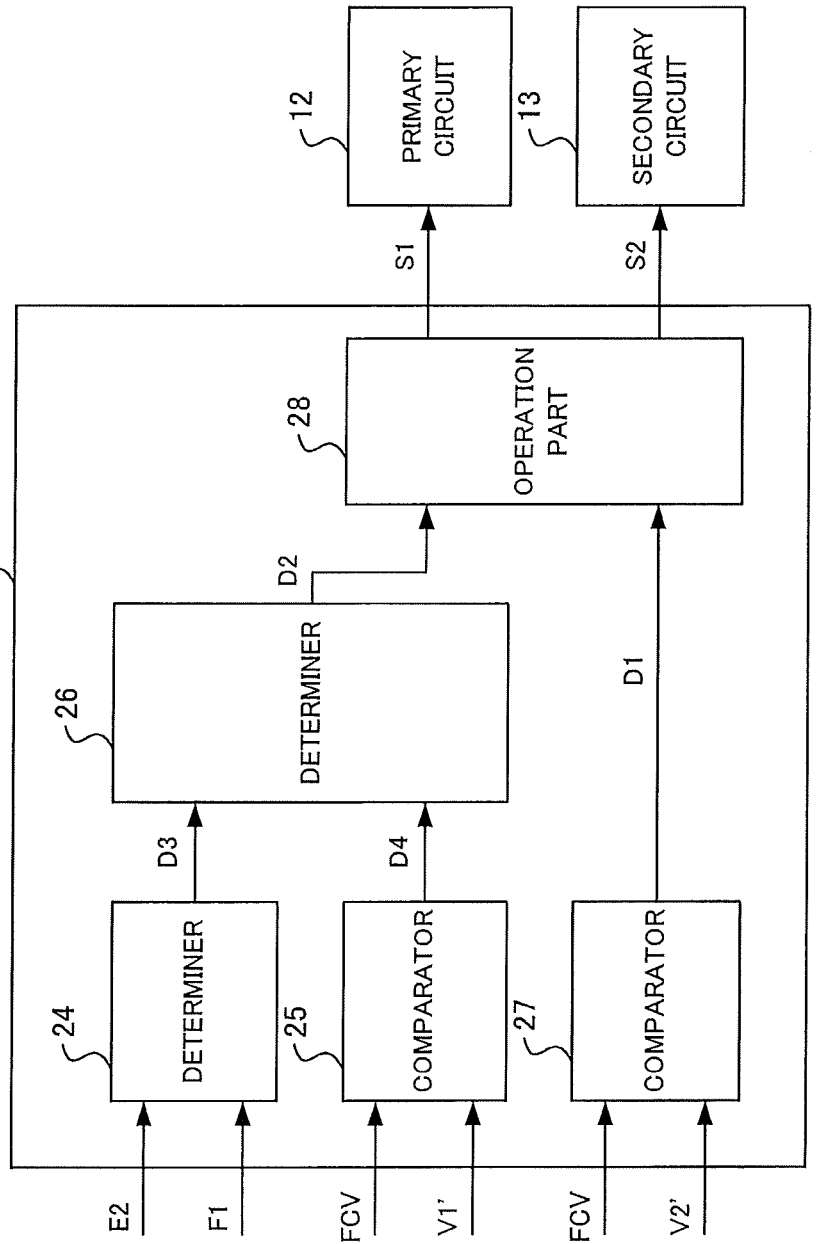
FIG. 4 is a block diagram illustrating a configuration example of a controller according to Embodiment 2 of the present disclosure.
Figure 5:
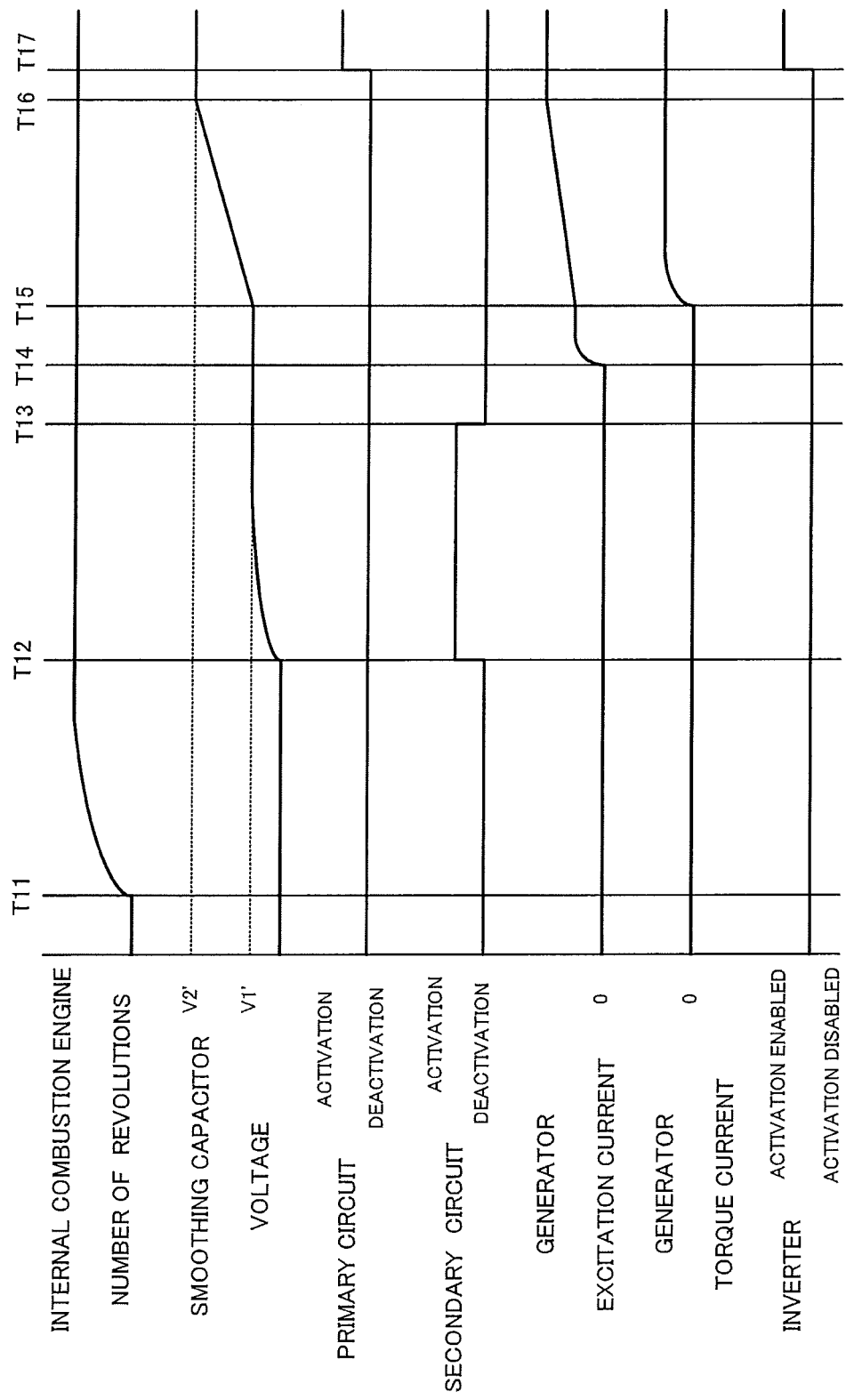
FIG. 5 is a timing chart illustrating starting operation of the generator performed by the railway vehicle control apparatus according to Embodiment 2.

FIG. 4 is a block diagram illustrating a configuration example of a controller according to Embodiment 2 of the present disclosure. FIG. 4 illustrates portions of the controller 17 relating to controlling the primary circuit 12 and the secondary circuit 13. The controller 17 includes a determiner 24 that acquires the start operation completion signal E2 of the internal combustion engine 2 and a charge command F1 of the smoothing capacitor 15, a comparator 25 to which the voltage FCV of the smoothing capacitor 15 and a threshold voltage V1' are input, a determiner 26 outputting the drive command D2 based on the outputs of the determiner 24 and the comparator 25, a comparator 27 outputting the drive command D1 based on the voltage FCV of the smoothing capacitor 15 and a threshold voltage V2', and an operation part 28 outputting the control signals S1 and S2 to the primary circuit 12 and the secondary circuit 13 based on the outputs of the determiner 26 and the comparator 27. FIG. 5 is a timing chart illustrating a starting operation of the generator performed by the railway vehicle control apparatus according to Embodiment 2. With reference to FIG. 4 and FIG. 5, a description is given of starting operation of the generator 3 performed by the railway vehicle control apparatus 1.

Sufficient electric power is stored in the electric power storage device connected between the secondary side terminals of the first power conversion device 11. At time T11, engine starting operation by the train crew, for example, starts the starting operation of the generator 3 by the railway vehicle control apparatus 1, and the starting device starts the internal combustion engine 2. The starting device is a device disposed outside the railway vehicle control apparatus 1, and is the cell motor disposed, for example, in the internal combustion engine 2. After the start of the internal combustion engine 2 is completed and the number of revolutions is stabilized, at a time T12, when the determiner 24 acquires the start operation completion signal E2 of the internal combustion engine 2 and the charge command F1 of the smoothing capacitor 15, for example, from the control apparatuses mounted on the railway vehicle, the determiner 24 sends a level H signal D3 to the determiner 26. When the determiner 24 does not acquire at least one of the start operation completion signal E2 of the internal combustion engine 2 or the charge command F1 of the smoothing capacitor 15, the determiner 24 sends a level L signal D3 to the determiner 26.

Instead of acquiring the start operation completion signal E2 of the internal combustion engine 2, the determiner 24 may determine whether a start of the internal combustion engine 2 is completed based on the number of revolutions of the internal combustion engine 2, the number of revolutions of the generator 3 or the like. In addition, instead of acquiring the charge command F1 of the smoothing capacitor 15, the determiner 24 may use the start operation completion signal E2 of the internal combustion engine 2 delayed for a certain time as the charge command F1 of the smoothing capacitor 15.

When the determiner 26 receives a level H signal D3, the determiner 26 sends the drive command D2 instructing the activation of the switching element of the secondary circuit 13, and, for example, a level H drive command D2 to the operation part 28. When the operation part 28 receives the level H drive command D2, the operation part 28 performs the control operation necessary for the activation of the switching element of the secondary circuit 13 and sends, to the secondary circuit 13, the control signal S2 activating the switching element of the secondary circuit 13. While the switching element of the secondary circuit 13 is activated, the switching element of the primary circuit 12 is controlled to be in the deactivated state. By the controller 17 controlling the primary circuit 12 and the secondary circuit 13 as described above, the first power conversion device 11 converts the electric power stored in the electric power storage device to charge the smoothing capacitor 15.

The voltage FCV of the smoothing capacitor 15 and the threshold voltage V1' are input into the comparator 25. The comparator 25 compares the voltage FCV with the threshold voltage V1' and sends a signal D4 to the determiner 26. When the voltage FCV is greater than or equal to the threshold voltage V1', the signal D4 is at an H level, and the voltage FCV is less than the threshold voltage VP, the signal D4 is at an L level. For example, the threshold voltage V1' is determined in response to characteristics of the generator 3. When an initial charge of the smoothing capacitor 15 is completed at a time T13 and level of the signal D4 changes from an L level to an H level, the determiner 26 changes the drive command D2 to an L level. When the drive command D2 reaches the L level, the operation part 28 stops output of the control signal S2 activating the switching element of the secondary circuit 13, and causes deactivation of the switching element of the secondary circuit 13. In addition, the switching element of the primary circuit 12 remains in the deactivated state.

After the switching element of the primary circuit 12 and the switching element of the secondary circuit 13 are deactivated, at a time T14, the controller 17 controls the second power conversion device 14 such that the second power conversion device 14 converts the electric power stored in the smoothing capacitor 15 to supply electric power for causing the generator 3 to operate. At the time T14, supply of an excitation current is started from the second power conversion device 14 to the generator 3, causing excitation of the generator 3. At a time T15, the controller 17 controls the second power conversion device 14, and the second power conversion device 14 starts a constant voltage control.

When the voltage FCV is greater than or equal to a threshold voltage V2' at time T16, a torque current becomes constant by the constant voltage control of the second power conversion device 14 to keep the voltage of the smoothing capacitor 15 constant. The voltage FCV of the smoothing capacitor 15 and the threshold voltage V2' are input into the comparator 27. The comparator 27 compares the voltage FCV with the threshold voltage V2' and sends the drive command D1 to the operation part 28, the drive command D1 commanding an activation or a deactivation of the switching element of the primary circuit 12. When the voltage FCV is greater than or equal to the threshold voltage V2', the drive command D1 is at an H level, and when the voltage FCV is less than the threshold voltage V2', the drive command D1 is at an L level. The threshold voltage V2' can be determined in response, for example, to the characteristics of the second power conversion device 14, the inverter 16 or the like.

At a time T17, the drive command D1 output by the comparator 27 changes from the L level to the H level. When the operation part 28 receives the level H drive command D1, the operation part 28 performs the control operation necessary for the activation of the switching element of the primary circuit 12 and sends, to the primary circuit 12, the control signal S1 activating the switching element of the primary circuit 12. While the switching element of the primary circuit 12 is activated, the switching element of the secondary circuit 13 is controlled to be in the deactivated state. As described above, the controller 17 controls the primary circuit 12 and the secondary circuit 13 such that the first power conversion device 11 converts the electric power supplied between the secondary side terminals of the second power conversion device 14 to charge the electric power storage device.

At the time T17, the inverter 16 is in a state of capable of being activated. Then, when a powering command is input by the operation of a train crew, the inverter 16 starts to operate and drives the motor 4, and the railway vehicle starts running Due to charging of the electric power storage device by the first power conversion device 11 after the time T17, the voltage of the electric power storage device, which drops due to the charge of the smoothing capacitor 15, rises again, and the generator 3 is in a state of capable of being restarted.

In addition, after having performed the control operation necessary for the activation of the switching element of the primary circuit 12 and the switching element of the secondary circuit 13, the operation part 28 may determine which one of the switching element of the primary circuit 12 and the switching element of the secondary circuit 13 is to be activated based on the outputs of the determiner 26 and the comparator 27, and the operation part 28 may output the control signals S1 and S2.

Due to activation of only one of the switching element of the primary circuit 12 and switching element of the secondary circuit 13, the power transmission direction in the first power conversion device 11 can be controlled, and a backflow of the electric power can be prevented. In addition, no contactor is required between the high voltage circuit including the smoothing capacitor 15 and the low voltage circuit including the electric power storage device, and the structure may be simple.

As described above, by the railway vehicle control apparatus 1 according to the present Embodiment 2, while preventing contacts between the high voltage circuit and the low voltage circuit, the electric power can be supplied, in a simpler configuration, for causing the generator to operate that is driven by the internal combustion engine.

Figure 6:
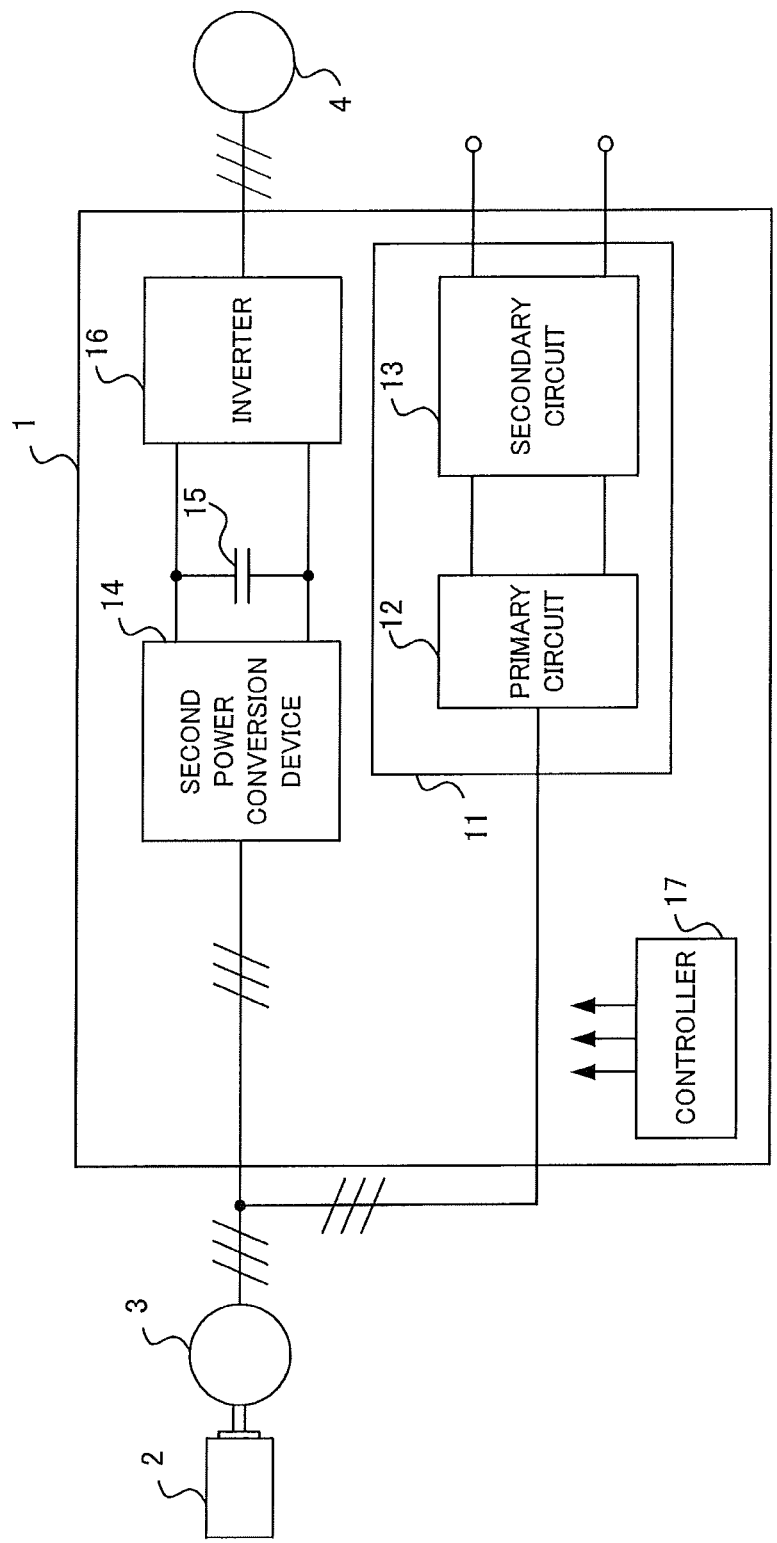
FIG. 6 is a block diagram illustrating another configuration example of the railway vehicle control apparatus according to an embodiment of the present disclosure.

Embodiments of the present disclosure are not limited to the above-mentioned embodiments. FIG. 6 is a block diagram illustrating another configuration example of the railway vehicle control apparatus according to an embodiment of the present disclosure. In the example of FIG. 6, the first power conversion device 11 and the second power conversion device 14 are connected, in parallel to each other, to the output side of the generator 3. The first power conversion device 11 is an AC-DC converter. The railway vehicle control apparatus 1 illustrated in FIG. 6 supplies the electric power for causing the generator 3 to operate similarly to the Embodiments 1 and 2. The first power conversion device 11 may be connected to only two wire connections among wire connections between the generator 3 and the second power conversion device 14.

A description is given of operation of the railway vehicle control apparatus 1 illustrated in FIG. 6 in a case in which the internal combustion engine 2, as in Embodiment 1, does not have the starting device such as the cell motor. While the generator 3 is stopped, by the controller 17 activating the switching element of the secondary circuit 13 and deactivating the switching element of the primary circuit 12, the first power conversion device 11 converts the electric power input from the secondary side of the first power conversion device 11 to supply electric power to the generator 3. Similar to Embodiment 1, when the controller 17 acquires the start operation completion signal E2 of the internal combustion engine 2, the controller 17 deactivates the switching element of the primary circuit 12 and the switching element of the secondary circuit 13. During the operation of the generator 3, when, for example, the output electric current of the generator 3 increases to greater than a threshold current, the controller 17 activates the switching element of the primary circuit 12 and deactivates the switching element of the secondary circuit 13 such that the first power conversion device 11 converts the AC power output by the generator 3 to DC power to charge, for example, the electric power storage device connected to the secondary side.

Operations of the railway vehicle control apparatus 1 illustrated in FIG. 6 are described when the internal combustion engine 2 includes the starting device such as the cell motor. When the starting operation of the internal combustion engine 2 is completed while the generator 3 is stopped, by the controller 17 activating the switching element of the secondary circuit 13 and deactivating the switching element of the primary circuit 12, the first power conversion device 11 converts the electric power input from the secondary side of the first power conversion device 11 to supply electric power to the generator 3. After the excitation of the generator 3 is completed, the controller 17 deactivates the switching element of the primary circuit 12 and the switching element of the secondary circuit 13. When, for example, the output electric current of the generator 3 increases greater than or equal to a first threshold current, the controller 17 determines that the excitation of the generator is completed. During operation of the generator 3, for example, when the output current of the generator 3 is greater than or equal to a second threshold current greater than the first threshold current, by the controller 17 activating the switching element of the primary circuit 12 and deactivating the switching element of the secondary circuit 13, the first power conversion device 11 converts the AC power output by the generator 3 to DC power to charge, for example, the electric power storage device connected to the secondary side.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Railway vehicle control apparatus
2 Internal combustion engine
3 Generator
4 Motor
11 First power conversion device
12 Primary circuit
13 Secondary circuit
14 Second power conversion device
15 Smoothing capacitor
16 Inverter
17 Controller
21, 24, 26 Determiner
22, 25, 27 Comparator
23, 28 Operation part

The invention claimed is:

1. A railway vehicle control apparatus comprising:
a first power conversion device comprising a primary circuit and a secondary circuit, each including a switching element, each to operate as a power conversion circuit when the switching element is activated, and each to operate as a rectifier circuit when the switching element is deactivated, the first power conversion device performing bidirectional power conversions between a primary side and a secondary side; and
a controller to perform control to deactivate, when one of either the switching element of the primary circuit or the switching element of the secondary circuit is activated, the other switching element;
wherein, while an alternating current generator is stopped that is disposed on the primary side of the first power conversion device and driven by an internal combustion engine to output alternating current power, the controller activates the switching element of the secondary circuit and deactivates the switching element of the primary circuit such that the first power conversion device converts electric power input from the secondary side to supply electric power for causing the alternating current generator to operate; and
wherein, during operation of the alternating current generator, the controller activates the switching element of the primary circuit and deactivates the switching element of the secondary circuit such that the first power conversion device converts electric power supplied from the alternating current generator to output the converted electric power to the secondary side;
the railway vehicle control apparatus further comprising:
a second power conversion device, a primary side thereof being connected to the alternating current generator, to perform bidirectional power conversions between the primary side and a secondary side;
a smoothing capacitor connected to secondary side terminals of the second power conversion device and connected to terminals of the primary side of the first power conversion device; and
an inverter connected in parallel with the smoothing capacitor between the secondary side terminals of the second power conversion device;
wherein the controller further controls the second power conversion device;
wherein, while the alternating current generator is stopped: (i) the controller, in response to a start command of the internal combustion engine, activates the switching element of the secondary circuit, and deactivates the switching element of the primary circuit such that the first power conversion device converts electric power stored in an electric power storage device connected to the secondary side terminals of the first power conversion device to charge the smoothing capacitor; (ii) thereafter the controller controls the second power conversion device such that the second power conversion device converts electric power stored in the smoothing capacitor to supply electric power for causing the alternating current generator to operate; (iii) the internal combustion engine is started by a torque output by the alternating current generator to which electric power from the second power conversion device is supplied and (iv) when starting operation of the internal combustion engine is completed, the controller deactivates the switching element of the primary circuit and the switching element of the secondary circuit; and wherein while the alternating current generator is operated: (i) the controller controls the second power conversion device such that the second power conversion device converts the electric power supplied from the alternating current generator to charge the smoothing capacitor; and (ii) thereafter, when the voltage of the smoothing capacitor is greater than or equal to a threshold and the inverter is in a state of capable of being activated, the controller activates the switching element of the primary circuit and deactivates the switching element of the secondary circuit such that the first power conversion device converts the electric power supplied to the secondary side terminals of the second power conversion device to charge the electric power storage device.

2. A railway vehicle control apparatus comprising:
a first power conversion device comprising a primary circuit and a secondary circuit, each including a switching element, each to operate as a power conversion circuit when the switching element is activated, and each to operate as a rectifier circuit when the switching element is deactivated, the first power conversion device performing bidirectional power conversions between a primary side and a secondary side; and
a controller to perform control to deactivate, when one of either the switching element of the primary circuit or the switching element of the secondary circuit is activated, the other switching element;
wherein, while an alternating current generator is stopped that is disposed on the primary side of the first power conversion device and driven by an internal combustion engine to output alternating current power, the controller activates the switching element of the secondary circuit and deactivates the switching element of the primary circuit such that the first power conversion device converts electric power input from the secondary side to supply electric power for causing the alternating current generator to operate; and
wherein, during operation of the alternating current generator, the controller activates the switching element of the primary circuit and deactivates the switching element of the secondary circuit such that the first power conversion device converts electric power supplied from the alternating current generator to output the converted electric power to the secondary side;
the railway vehicle control apparatus further comprising:
a second power conversion device, a primary side thereof being connected to the alternating current generator, to perform bidirectional power conversions between the primary side and a secondary side;
a smoothing capacitor connected to secondary side terminals of the second power conversion device and connected to terminals of the primary side of the first power conversion device; and
an inverter that is a load device connected in parallel with the smoothing capacitor between the secondary side terminals of the second power conversion device;
wherein the controller further controls the second power conversion device;
wherein, while the alternating current generator is stopped, when starting operation of the internal combustion engine is completed by an external starting device, the controller activates the switching element of the secondary circuit and deactivates the switching element of the primary circuit such that the first power conversion device converts electric power stored in an electric power storage device connected to the secondary side terminals of the first power conversion device to charge the smoothing capacitor; and thereafter, when the voltage of the smoothing capacitor is greater than or equal to a first threshold, the controller deactivates the switching element of the primary circuit and the switching element of the secondary circuit, and the controller controls the second power conversion device after the switching element of the primary circuit and the switching element of the secondary circuit are deactivated such that the second power conversion device converts electric power stored in the smoothing capacitor to supply electric power for causing the alternating current generator to operate and to excite the alternating current generator;

wherein while the alternating current generator is operated: (i) the controller controls the second power conversion device such that the second power conversion device converts the electric power supplied from the alternating current generator to charge the smoothing capacitor; and (ii) thereafter, when the voltage of the smoothing capacitor is greater than or equal to a second threshold that is greater than the first threshold and the inverter is in a state of capable of being activated, the controller activates the switching element of the primary circuit and deactivates the switching element of the secondary circuit such that the first power conversion device converts the electric power supplied to the secondary side terminals of the second power conversion device to charge the electric power storage device.

3. A railway vehicle control apparatus comprising:
a first power conversion device comprising a primary circuit and a secondary circuit, each including a switching element, each to operate as a power conversion circuit when the switching element is activated, and each to operate as a rectifier circuit when the switching element is deactivated, the first power conversion device performing bidirectional power conversions between a primary side and a secondary side; and
a controller to perform control to deactivate, when one of either the switching element of the primary circuit or the switching element of the secondary circuit is activated, the other switching element;
wherein, while an alternating current generator is stopped that is disposed on the primary side of the first power conversion device and driven by an internal combustion engine to output alternating current power, the controller activates the switching element of the secondary circuit and deactivates the switching element of the primary circuit such that the first power conversion device converts electric power input from the secondary side to supply electric power for causing the alternating current generator to operate; and
wherein, during operation of the alternating current generator, the controller activates the switching element of the primary circuit and deactivates the switching element of the secondary circuit such that the first power conversion device converts electric power supplied from the alternating current generator to output the converted electric power to the secondary side;
the railway vehicle control apparatus, further comprising a second power conversion device, a primary side thereof being connected to the alternating current generator, to perform bidirectional power conversions between the primary side and a secondary side;

wherein the first power conversion device is an alternating current-direct current converter, the primary side of which is connected to the output side of the alternating current generator;
the first power conversion device and the second power conversion device are connected, in parallel to each other, to the output side of the alternating current generator;
wherein, while the alternating current generator is stopped, the controller activates the switching element of the secondary circuit, and deactivates the switching element of the primary circuit such that the first power conversion device converts electric power stored in an electric power storage device connected to the secondary side terminals of the first power conversion device to supply the converted electric power to the alternating current generator; and
wherein, during the operation of the alternating current generator, the controller activates the switching element of the primary circuit, and deactivates the switching element of the secondary circuit such that the first power conversion device converts the electric power output by the alternating current generator to charge the electric power storage device.

4. The railway vehicle control apparatus according to claim 3,
wherein, while the alternating current generator is stopped, the controller, in response to a start command of the internal combustion engine, activates the switching element of the secondary circuit, and deactivates the switching element of the primary circuit;
wherein, when the internal combustion engine is started by a torque output by the alternating current generator to which electric power from the first power conversion device is supplied and starting operation of the internal combustion engine is completed, the controller deactivates the switching element of the primary circuit and the switching element of the secondary circuit; and
wherein, when electric current output by the alternating current generator is greater than or equal to a threshold during the operation of the alternating current generator, the controller activates the switching element of the primary circuit, and deactivates the switching element of the secondary circuit.

5. The railway vehicle control apparatus according to claim 3,
wherein, when starting operation of the internal combustion engine is completed by an external starting device while the alternating current generator is stopped, the controller activates the switching element of the secondary circuit, and deactivates the switching element of the primary circuit to excite the alternating current generator;
wherein, when excitation of the alternating current generator is completed, the controller deactivates the switching element of the primary circuit and the switching element of the secondary circuit; and
wherein, when electric current output by the alternating current generator is greater than or equal to a threshold during the operation of the alternating current generator, the controller activates the switching element of the primary circuit, and deactivates the switching element of the secondary circuit.

* * * * *